(12) United States Patent
Reineke et al.

(10) Patent No.: US 12,093,366 B2
(45) Date of Patent: Sep. 17, 2024

(54) METHOD AND APPARATUS FOR ESTABLISHING TRUSTED PCIe RESOURCE SHARING

(71) Applicant: Dell Products, L.P., Hopkinton, MA (US)

(72) Inventors: Nicole Reineke, Northborough, MA (US); JoAnne Hubbard, Concord, MA (US); Hanna Yehuda, Acton, MA (US); Debra Arneson, Henniker, NH (US); Corinne Schulze, Hopkinton, MA (US); Alan Sevajian, Salem, NH (US); Robert Alan Barrett, Austin, TX (US)

(73) Assignee: Dell Products, L.P., Hopkinton, MA (US)

( * ) Notice: Subject to any disclaimer, the term of this patent is extended or adjusted under 35 U.S.C. 154(b) by 432 days.

(21) Appl. No.: 17/577,603

(22) Filed: Jan. 18, 2022

(65) Prior Publication Data
US 2023/0229751 A1 Jul. 20, 2023

(51) Int. Cl.
*G06F 13/36* (2006.01)
*G06F 13/42* (2006.01)
*G06F 21/44* (2013.01)

(52) U.S. Cl.
CPC .......... *G06F 21/44* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| 10,997,113 | B1 | 5/2021 | Reineke et al. | |
|---|---|---|---|---|
| 2011/0299537 | A1* | 12/2011 | Saraiya | H04L 69/16 370/392 |
| 2015/0026385 | A1* | 1/2015 | Egi | H04L 47/785 710/314 |
| 2020/0028911 | A1* | 1/2020 | Sun | G06F 3/065 |
| 2021/0064438 | A1* | 3/2021 | Zhou | G06F 9/5072 |

* cited by examiner

*Primary Examiner* — Henry Tsai
*Assistant Examiner* — Dean Phan
(74) *Attorney, Agent, or Firm* — Anderson Gorecki LLP (57) ABSTRACT

A PCIe resource management system includes a PCIe resource registration subsystem and a PCIe resource monitoring subsystem. Assets register to use PCIe resources of other assets and to allow other assets to use their PCIe resources. Assets specify which types of PCIe resources it can borrow, when it can borrow those PCIe resources, and a logical group of other assets from which the asset can borrow the PCIe resources. Assets also specify which types of PCIe resources it will lend, when it will lend those PCIe resources, and a logical group of other assets to which the asset will lend the PCIe resources. The PCIe resource registration subsystem maintains a PCIe resource registration datastore maintaining PCIe borrow and lending rules associated with assets in logical groups of assets. PCIe resources are shared between assets in the logical groups as needed, as determined by the PCIe resource monitoring subsystem.

17 Claims, 8 Drawing Sheets

Historic PCIe Resource Utilization
Datastore 160

| Borrowing Asset PK 700 | Lending Asset PK 705 | Org. ID 710 | Group ID 715 | PCI resource Type 720 | Duration 725 | Credit 730 |
|---|---|---|---|---|---|---|
| 1050054 | 1050052 | 3456 | 47 | GPU | 1 hour | -1 |
| 995865 | 1050053 | 4000 | 22 | Graphics | 2 hours | +2 |
| ... | | | | | | |
| 1050052 | 1050054 | 3456 | 47 | GPU | 15 min | -1 |

FIG. 8

METHOD AND APPARATUS FOR ESTABLISHING TRUSTED PCIe RESOURCE SHARING

FIELD

This disclosure relates to computing systems and related devices and methods, and, more particularly, to a method and apparatus for establishing trusted PCIe resource sharing.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A Peripheral Component Interconnect Express (PCIe) resource management system includes a PCIe resource registration subsystem and a PCIe resource monitoring subsystem. Assets register to use PCIe resources of other assets and to allow other assets to use their PCIe resources. In connection with registering to borrow PCIe resources from other assets, the asset specifies which types of PCIe resources it can borrow, when it can borrow those PCIe resources, and a logical group of other assets from which the asset can borrow the PCIe resources. In connection with registering to lend PCIe resources to other assets, the asset specifies which types of PCIe resources it will lend, when it will lend those PCIe resources, and a logical group of other assets to which the asset will lend the PCIe resources. The PCIe resource registration subsystem maintains a PCIe resource registration datastore maintaining PCIe borrow and lending rules associated with assets in logical groups of assets. The PCIe resource monitoring subsystem monitors asset use conditions to determine the occurrence of a need for PCIe resources or the ability for an asset to lend use of its PCIe resources to other assets in the logical group. A PCIe resource assignment system assigns PCIe resources based on the PCIe sharing rules contained in the PCIe resource registration datastore to constrain borrowing and lending of PCIe resources to only occur between assets of the logical groups, thus enhancing security associated with PCIe resource sharing.

DETAILED DESCRIPTION

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Many computer implemented "assets 100", such as laptop computers, desktop computers, storage systems, and other computer systems, have PCIe resources 105 that are used by the asset 100 to perform particular tasks. As used herein, the term "asset 100" is used to refer to any computer system, such as a laptop computer, desktop computer, storage system, or other computer system, that has a PCIe bus 270 that the asset 100 uses to access one or more PCIe resources 105. As used herein, the term "PCIe resource 105" include any resource that can be connected to the asset 100 using a PCIe slot of the PCIe bus 270. Example PCIe resources 105 include Central Processing Units (CPUs), Graphics Processing Units (GPUs), graphics cards, memory cards, video processing systems, credit card readers, network cards, and any other computer component that may be connected to the PCIe bus 270 using one of the PCIe slots 275.

When properly configured, assets 100 can share PCIe resources 105 with each other. Enabling use of physical hardware resources by multiple assets 100 is environmentally friendly, because fewer instances of the hardware resources are required to be produced and distributed, and fewer instances of the hardware resources will be using electricity thus providing overall energy savings.

In an environment where assets were restricted to sharing PCIe resources 105 with locally proximate physically connected devices, it was possible to constrain the set of assets that could share PCIe resources. However, with the continued development of low latency, high bandwidth, and higher available wireless networks, it may be possible for assets 100 that are not physically connected to access and use PCIe resources 105 of other assets 100 that are connected to the wireless network. This enables expansion of an independent physical host to include capabilities supplied by hardware that are not part of their existing physical hardware resources, and expand previously restrictive limitations which, from a security standpoint, can present problems. For example, in an enterprise context, a given organization might not want to provide access to PCIe resources 105 outside of the organization. Further, within an organization, the organization might want to limit PCIe resource 105 use on particular assets 100.

Figure 1:
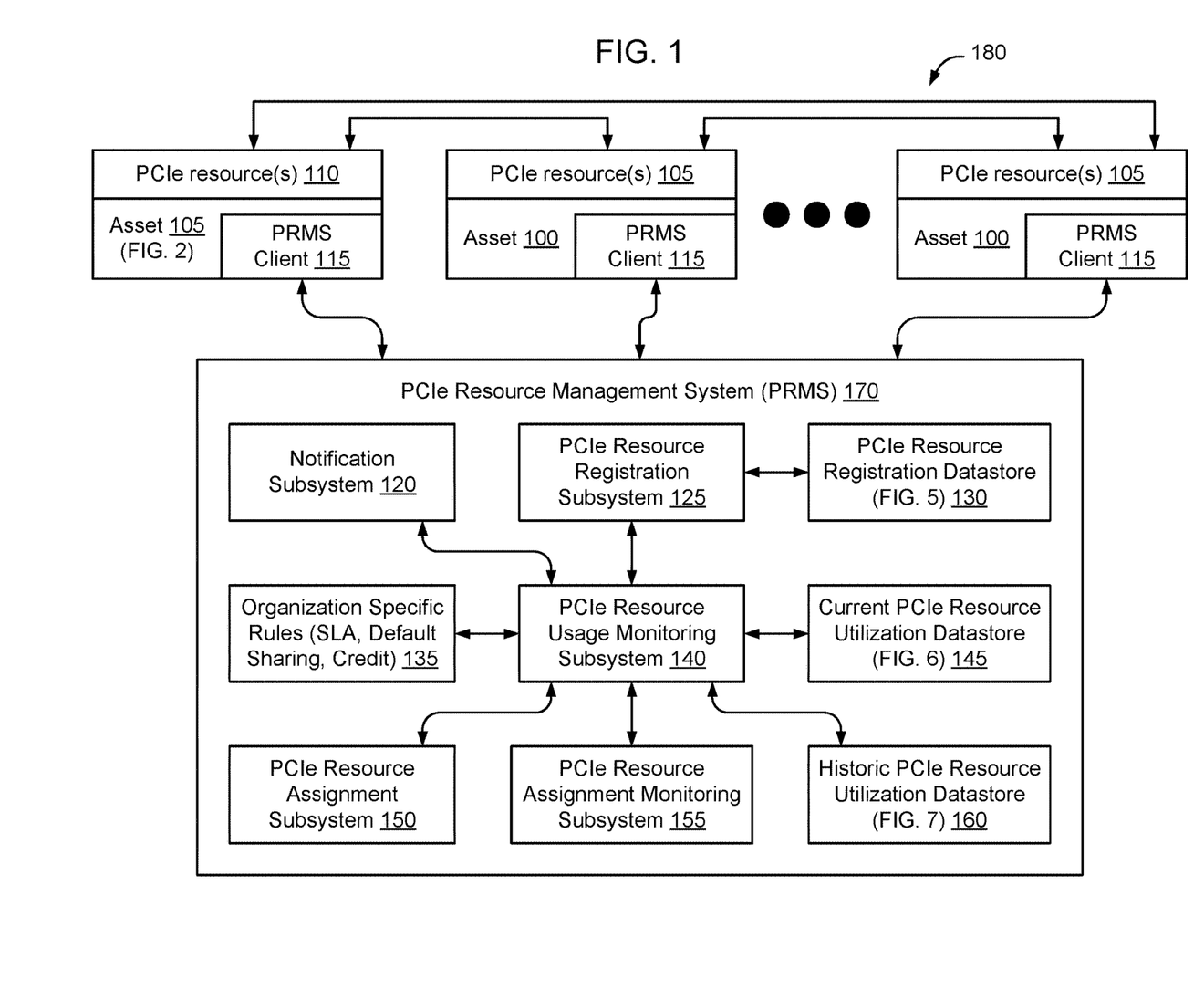
FIG. 1 is a functional block diagram of an example PCIe resource Management System (PRMS) connected to a plurality of assets with sharable PCIe resources, according to some embodiments.

According to some embodiments, a PCIe Resource Management System (PRMS) 170 includes a PCIe resource registration subsystem 125 and a PCIe resource monitoring subsystem 140. Assets 100 register to use PCIe resources 105 of other assets 100 and to allow other assets 100 to use their PCIe resources 105. In connection with registering to use PCIe resources 105, the asset 100 specifies which types of PCIe resources 105 it would like to be able to use, when it would like to be able to use those PCIe resources, and the logical group of assets it would like to borrow PCIe resources from. In connection with registering to lend PCIe resources to other assets 100, the asset 100 specifies the type of PCIe resources it is willing to lend, when it is willing to lend the PCIe resources, and the logical group of other assets 100 that are allowed to use its PCIe resources 105. The PCIe resource registration subsystem 125 maintains a PCIe resource registration datastore 130 maintaining these PCIe resource borrowing and lending rules. The PCIe resource registration subsystem 125 maintains PCIe resource sharing rules, and optionally default PCI resource sharing rules, on a per-organization basis, per-asset 100 basis, and per-PCIe resource 105 basis. Time based PCI resource sharing rules are also maintained.

FIG. 1 is a functional block diagram of an example PCIe resource Management System (PRMS) ecosystem 180 having a PRMS 170 connected to a plurality of assets 100 with sharable PCIe resources 105, according to some embodiments. In some embodiments, the PRMS ecosystem 180 is configured to enable the secure controlled shared use of distributed wirelessly networked PCIe resources 105 between assets 100. By maintaining a PCIe resource registration datastore 130, which maintains associations between assets 100 and PCIe resource 105 use restrictions, the PRMS 170 is able to enable desired sharing of PCIe resources 105 while preventing undesired sharing of PCIe resources 105, thus enabling PCIe usage to take place in a secure and controlled manner. The PRMS enables right-access to external and internal resources for the extension of client needs, as detected by local service, administrator settings, and user request. It leverages PCIe capabilities, advances in fabric speed and reliability, to understand the utilization/occupancy of any of the resources available to an organization or between organizations, and will re-route and utilize the available resources for use in areas that are not part of their existing host definition.

As shown in FIG. 1, in some embodiments assets 100 with PCIe resources 105 connect to a PCIe Resource Management System (PRMS) 170 through PRMS clients 115. PRMS clients 115 may be downloaded to assets 100 when the assets 100 register with the PRMS 170 or may otherwise be installed on asset 100. In some embodiments, the PRMS client 115 is an application that is installed on asset 100.

Figure 5:
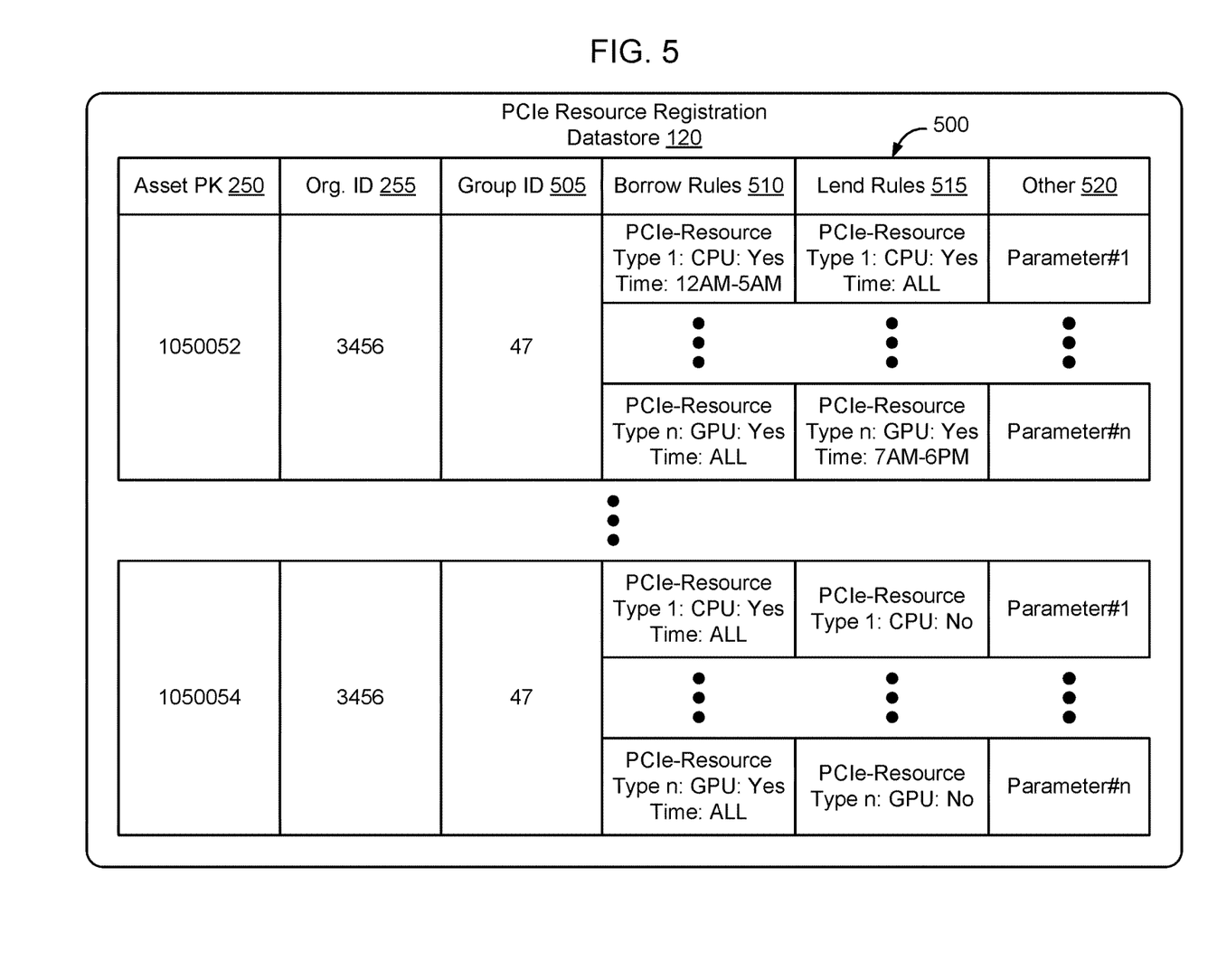
FIG. 5 is a functional block diagram of an example data structure configured to implement a PCIe resource registration datastore, according to some embodiments.

The PRMS 170, in some embodiments, includes a PCIe resource registration subsystem 125. Assets 100 register PCIe resource 105 with the PCIe resource registration subsystem 125 of PRMS 170 using a process such as the process described below in connection with FIG. 3. The PCIe registration process, in some embodiments, allows PCIe resource 105 sharing rules to be established for each type of PCIe resource 105 of the asset 100, and allows PCIe resource 105 sharing rules to be established for each type of PCIe resource 105 that the asset 100 would like to access via the PRMS 170. PCIe resource 105 sharing rules established for the PCIe resources 105 of the assets 100 are stored by the PCIe resource registration subsystem 125 in a PCIe resource registration datastore 130. An example data structure configured to implement the PCIe resource registration datastore 130 is shown in FIG. 5.

Figure 6:
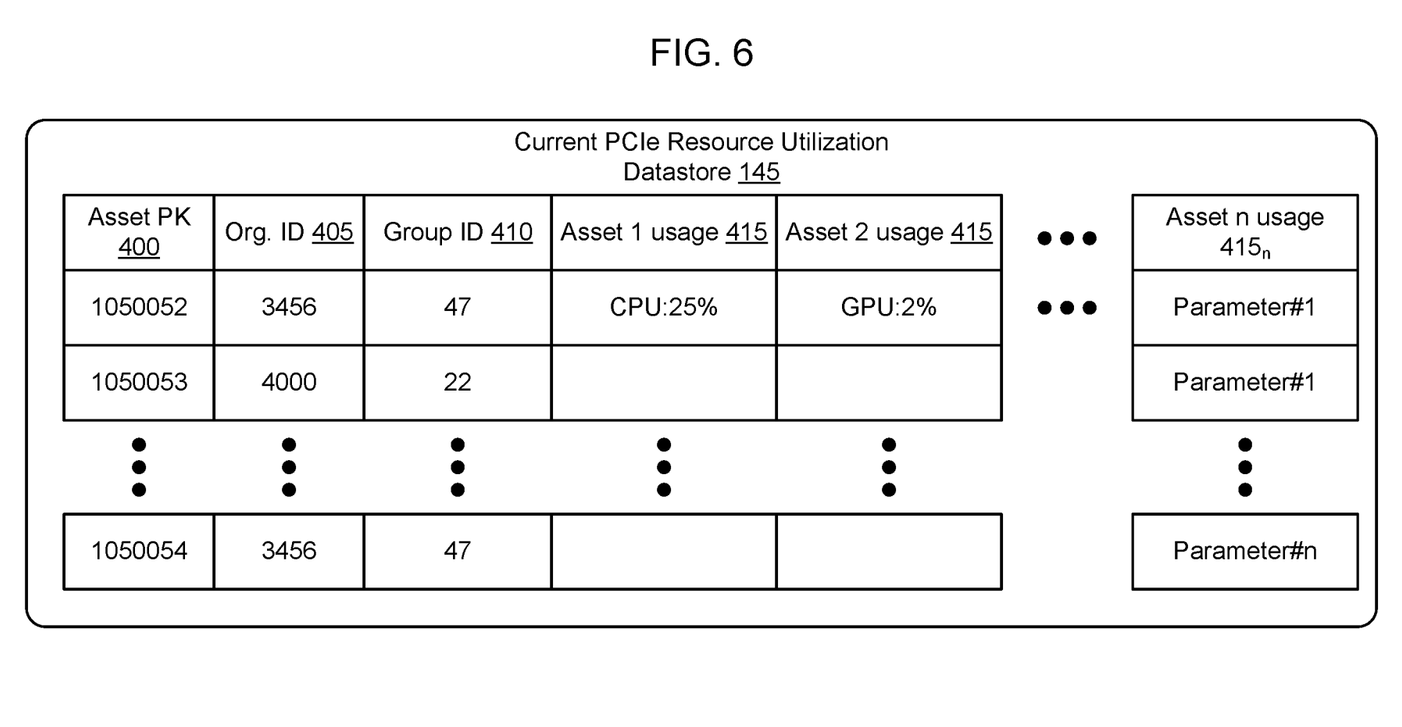
FIG. 6 is a functional block diagram of an example data structure configured to implement a current PCIe resource utilization datastore, according to some embodiments.
Figure 7:
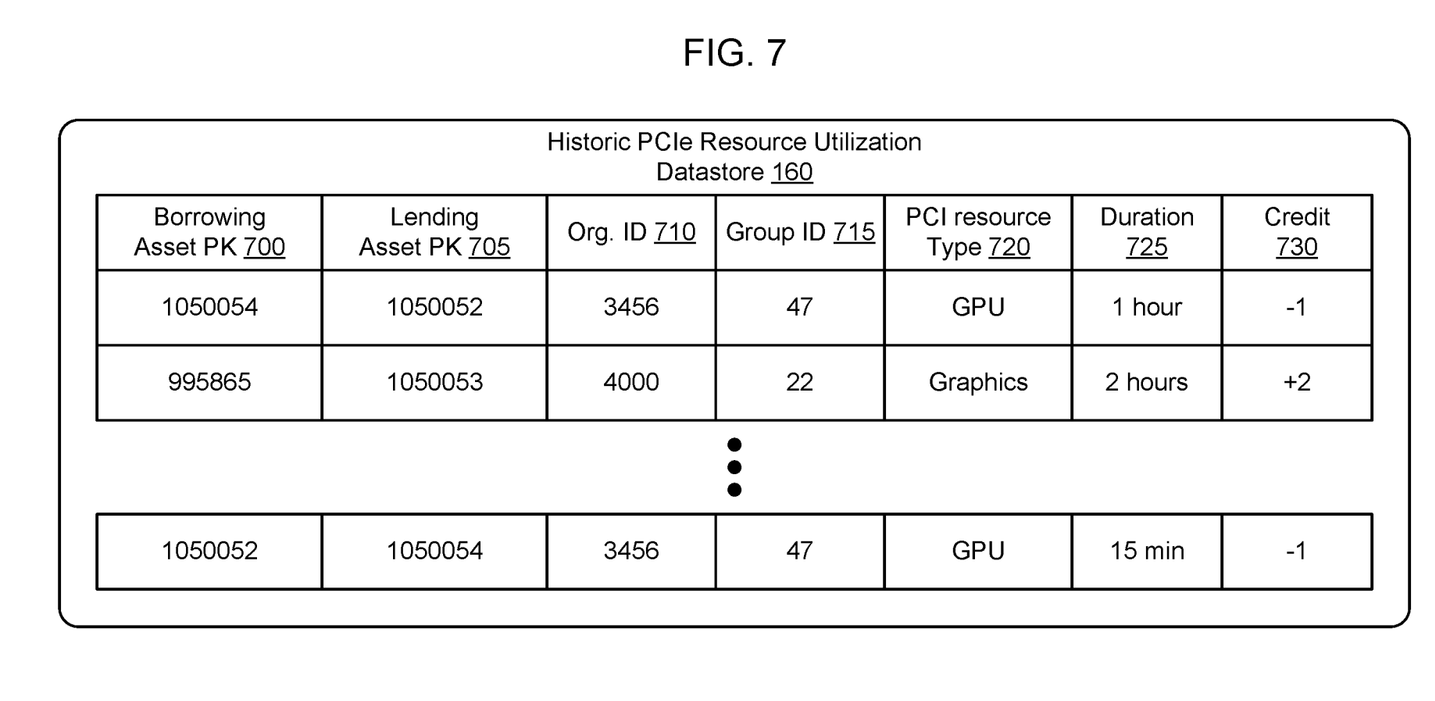
FIG. 7 is a functional block diagram of an example data structure configured to implement a historic PCIe resource utilization datastore, according to some embodiments.

The PRMS 170 also includes a PCIe resource 105 usage monitoring subsystem 140 that is configured to monitor usage of PCIe resources 105 of assets 100. In some embodiments, the PCIe resource 105 usage monitoring subsystem 140 stores current PCIe resource 105 usage information in a current PCIe resource utilization datastore 145. An example data structure configured to implement the current PCIe resource utilization datastore 145 is shown in FIG. 6. In some embodiments, the PCIe resource usage monitoring subsystem 140 stores historic PCIe resource 105 sharing information in a historic PCIe resource utilization datastore 160. An example data structure configured to implement the historic PCIe resource utilization datastore 160 is shown in FIG. 7.

In some embodiments, the PRMS 170 includes a PCIe resource assignment subsystem 150. If the PCIe resource usage monitoring subsystem 140 determines that a particular asset 100 needs to access one or more PCIe resources 105 of another asset 100, the PCIe resource assignment subsystem 150 selects a PCIe resource 105 for use by the particular asset 100 using the PCIe resource 105 sharing rules of the PCIe resource registration datastore 130. The selected PCIe resource 105 is then accessed by the particular asset 100, and use of the PCIe resource 105 is monitored by a PCIe resource assignment monitoring subsystem 155. Optionally, the PCIe resource assignment subsystem 150 may also implement PCIe resource assignment monitoring, depending on the implementation.

In some embodiments, the PRMS 170 includes a notification subsystem 120, configured to generate alerts about PCIe resource 105 sharing events. Example sharing events might include assignment of PCIe resources 105 to be used by particular assets 100, information related to particular PCIe resources 105 that are not available to be shared by assets 100 within a subset of assets 100 managed by the PRMS 170, or other information depending on the implementation.

In some embodiments, the PRMS 170 includes a database of organization specific rules 135. Example organization specific rules 135 might include default PCIe resource 105 sharing rules, Service Level Agreement (SLA) information, and other information such as credit information.

In some embodiments, the default PCIe resource 105 sharing rules might specify, for example, which assets 100 are part of a particular organization, which PCIe resources 105 are able to be shared by assets within the organization, the times that the PCIe resources 105 are able to be shared, and other parameters associated with sharing PCIe resources 105 between assets 100 associated with the organization.

SLA information, in some embodiments, is used by the PCIe resource 105 usage monitoring subsystem 140 to determine when an asset 100's current PCIe resource 105 usage is within expected parameters. A SLA violation or expected SLA violation by a particular asset 100 can be used as a trigger to proactively assign additional PCIe resources 105 to the asset 100 by PCIe resource assignment subsystem 150. The PCIe resource assignment is then monitored by PCIe resource assignment monitoring subsystem 155 and, when the SLA violation is no longer present, the PCI resource assignment may be ended.

As shown in FIG. 1, optionally in some embodiments the PRMS includes information about credits associated with each of the assets 100 or PCIe resources 105. Credits can be allocated to an asset 100 when the asset 100 allows use of its PCIe resources 105 and can be unallocated from the asset 100 when the asset 100 uses PCIe resources 105 of another asset 100. The particular number of credits that are allocated or unallocated may be based on the type of PCIe resource 105 that was used, the length of time the PCIe resource 105 was used, the proportion of the PCIe resource 105 that was used, and other factors. The use of credits, in some embodiments, facilitates tracking by the PRMS of the relative use of PCIe resources 105 among assets 100. In some embodiments, the PCIe resource credits are stored by the PCIe resource assignment monitoring subsystem 155 in a ledger, for example maintained by historic PCIe resource utilization datastore 160.

Figure 2:
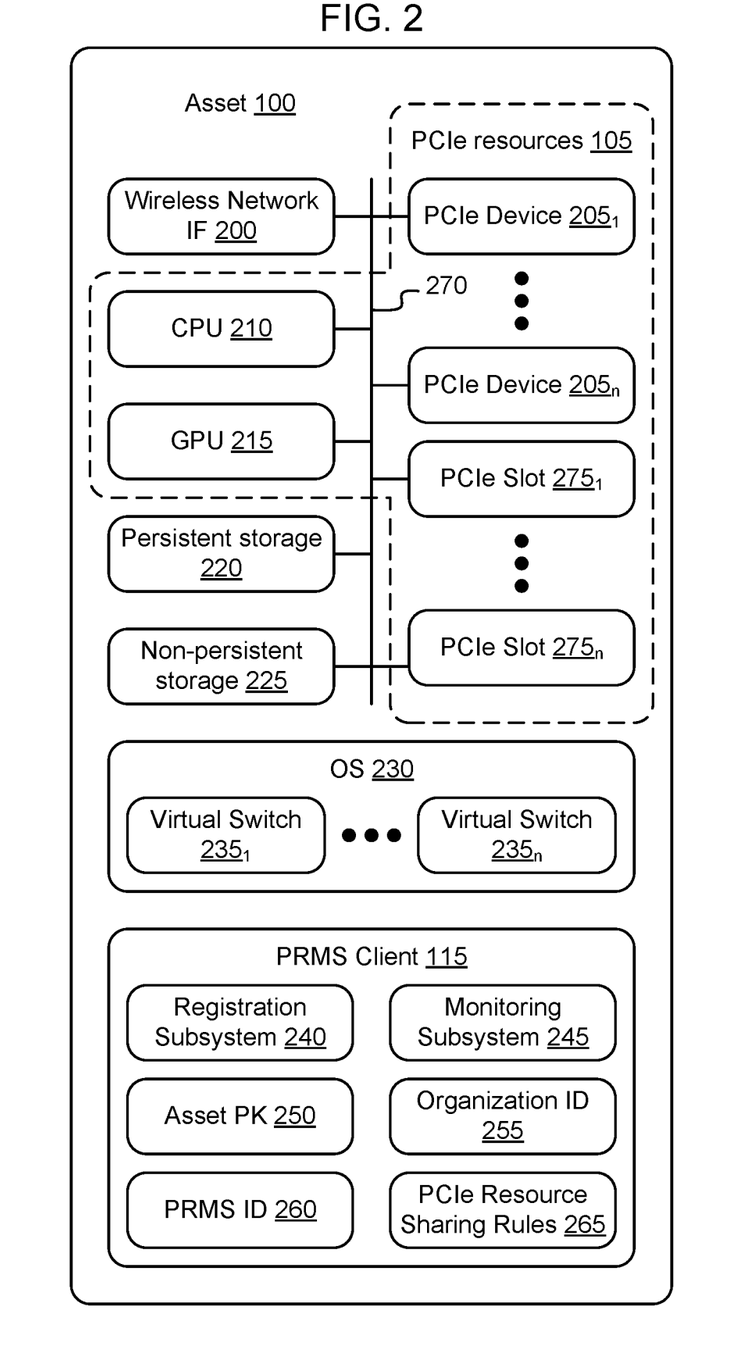
FIG. 2 is a functional block diagram of an example asset with sharable PCIe resources, according to some embodiments.

FIG. 2 is a functional block diagram of an example asset 100 with sharable PCIe resources 105, according to some embodiments. As shown in FIG. 2, in some embodiments the asset 100 has a PCIe bus 270. One or more CPUs 210, GPUs 215, persistent storage 220, non-persistent storage 225, and a number of PCI devices $205_1$-$205_n$ are connected to the PCIe bus 270. A set of PCIe slots $275_1$-$275_n$ are also connected to the bus. As PCIe devices 205 are added to the asset 100, the PCIe devices 205 can be connected to the PCIe bus 270 via PCIe slots $275_1$-$275_n$.

Asset 100 has operating system 230 which controls operation of asset 100. In some embodiments, one or more virtual switches $235_1$-$235_n$ are implemented on operating system 230 which enables the operating system 230 to virtually extend the PCIe bus 270 to use PCIe resources 105 physically located on other assets 100. A wireless network interface 200 enables the PCIe resources 105 that are physically located on other assets 100 to be accessed wirelessly via virtual switches $235_1$-$235_n$, without requiring the asset 100 to be physically connected to the other assets 100. Virtual switches 235 also allow other assets 100 to wirelessly access the PCIe resources of asset 100.

As shown in FIG. 2, in some embodiments asset 100 has instantiated thereon a PRMS client 115. In some embodiments, the PRMS client 115 has a registration subsystem 240 that is configured to communicate with the PCIe resource registration subsystem 125 of the PRMS 170. The registration subsystem 240 enables the asset 100 to register its PCIe resources 105 with the PRMS 170, and to register to use PCIe resources 105 of other assets 100 through the PRMS 170, by establishing PCIe resource 105 sharing rules 265. An example resource registration process is discussed below in connection with FIG. 3.

In some embodiments, the PRMS client 115 also has information that enable the asset 100 to be identified to the PRMS 170. Example information include Asset 100 Primary Key (PK) which uniquely identifies the asset 100 within the PRMS 170. The PRMS client 115 may optionally also include an organization ID 255 which identifies the asset 100 as belonging to a particular organization, sub-organization, or other logical group of assets, maintained by the PRMS 170. In embodiments where the PRMS 170 includes organization specific rules 135, specifying the organization ID to the PRMS client 115 enables the PRMS client 115 to identify the asset 100 as belonging to the organization, to ensure that the organization specific rules are applied to the asset 100 during the registration process. In some embodiments, an administrator may input the organization ID 255 as part of the registration process when the asset 100 is acquired or when the asset 100 is added to the PRMS ecosystem 180. Optionally, the asset 100 may be assigned a PRMS ID 260, depending on the implementation. Optionally, the asset may have multiple organization IDs to allow the asset to participate in multiple logical associations of assets. In some embodiments, PCIe resource sharing rules may be separately established for each logical group of assets, to enable the asset to specify different borrowing and lending rules for different logical groups of assets.

Figure 3:
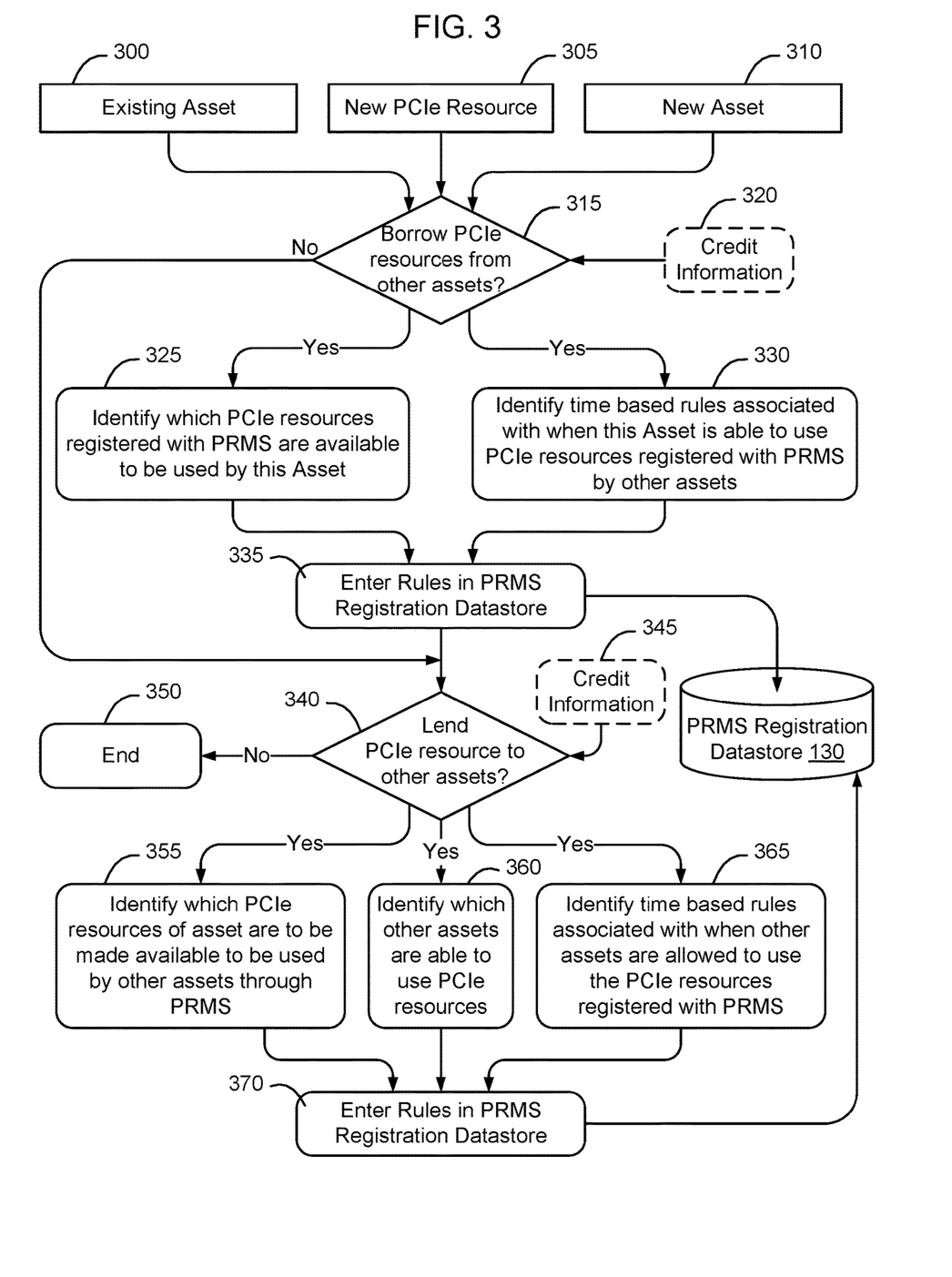
FIG. 3 is a flow chart of an example PCIe resource registration process, according to some embodiments.

FIG. 3 is a flow chart of an example PCIe resource 105 registration process, according to some embodiments. As shown in FIG. 3, registration of PCIe resources 105 with the PRMS 170 may occur when an existing asset 100 is added to the PRMS ecosystem 180 (block 300), when a new PCIe resource 105 is added to an asset 100 that is already registered with the PRMS 170 and is already a part of the PRMS ecosystem 180 (block 305), or when a new asset 100 is acquired and is added to the PRMS ecosystem 180 (block 310).

During the registration process, a determination is made as to whether the asset 100 will allow one or more PCIe resources 105 to be borrowed by other assets 100 that are part of the PRMS ecosystem 180 (block 315). In some embodiments, the determination is made by providing an administrator with a prompt, e.g. via a GUI provided by the notification subsystem 120, to enable the administrator to elect whether the asset 100 should be allowed to borrow PCIe resources 105 from other assets 100 through the PRMS ecosystem 180. Optionally, credit rate information associated with borrowing PCIe resources 105 may be displayed in connection with the prompt (block 320).

If the asset 100 elects to be able to borrow resources through the PRMS ecosystem 180 (a determination of YES at block 315), PCIe resource 105 sharing rules (PCI resource borrowing rules) are established for the asset 100 to specify what type of PCIe resources 105 the asset 100 may borrow, and when (during what times) the asset 100 is allowed to borrow the PCIe resources 105. For example, as shown in FIG. 3, in some embodiments the registration process identifies which types of PCIe resources 105 registered with the PRMS are available to be used by this asset 100 (block 325). In some embodiments, the PCIe resource registration subsystem 125 determines a universe of PCIe resources 105 available to be borrowed by assets 100 associated with the organization ID 255 of the asset 100 from PCIe resource registration database 130, and presents a set of available PCIe resources 105 that are available to be borrowed from other assets 100 associated with that organization ID 255. For each PCIe resource 105 that the asset 100 elects to be able to borrow, a corresponding time-based rule is created which specifies when the asset 100 is able to use the particular selected PCIe resource 105 (block 330). The PCIe resource 105 sharing rules (PCI resource borrowing rules) are entered into the PCIe resource registration datastore 130

(block 335). In some embodiments, the organization ID identifies the set of other assets of the logic group of other assets from which the asset is allowed to borrow PCIe resources 105 of the specified type. In some embodiments, different PCIe resource sharing rules can be established for different types of PCIe resources, and different organization IDs can be specified for different types of PCIe resources to enable a given asset to borrow different types of PCIe resources from different logical groups of other assets.

Once the asset 100 borrowing rules have been created (block 335), or if the asset 100 elects to not be able to borrow resources through the PRMS ecosystem 180 (a determination of NO at block 315), a determination is made as to whether the asset 100 will lend one or more of its PCIe resources 105 to other assets 100 that are part of the PRMS ecosystem 180 (block 340). In some embodiments, the determination is made by providing an administrator with a prompt, e.g. via a GUI provided by the notification subsystem 120, to enable the administrator to elect whether the asset 100 should be allowed to lend PCIe resources 105 to other assets 100 through the PRMS ecosystem 180. Optionally, credit rate information associated with lending PCIe resources 105 may be displayed in connection with the prompt (block 345).

If the asset 100 elects to not lend resources through the PRMS ecosystem 180 (a determination of NO at block 340), the registration process ends (block 350). If the asset 100 elects to be able to lend resources through the PRMS ecosystem 180 (a determination of YES at block 340), PCIe resource 105 sharing rules (PCI resource lending rules) are established for the asset 100 to specify what type of PCIe resources 105 the asset 100 will lend to other assets 100, and when (during what times) the PCIe resources 105 will be available to be used by other assets 100 in the PRMS ecosystem 180. For example, as shown in FIG. 3, in some embodiments the registration process identifies which PCIe resources 105 registered with the PRMS are to be made available to be used by other assets 100 (block 355). In some embodiments, the PRMS client 115 identifies PCIe resources 105 of the asset 100, and presents a set of available PCIe resources 105 that may be made available to be used by other assets 100 through the PRMS ecosystem 180. For each PCIe resource 105 that the asset 100 elects to be shared, a corresponding time-based rule is created which specifies when the PCIe resource 105 is able to used by other assets 100 (block 365). Optionally, use by other assets 100 may be constrained by enabling the asset 100 to specify which other assets 100 are able to use the PCIe resource 105 (block 360), for example by specifying an organization ID associated with the lending rule. The PCIe resource 105 sharing rules (PCIe resource 105 lending rules) are entered into the PCIe resource registration datastore 130 (block 370).

Although FIG. 3 shows the registration process as creating PCIe resource 105 borrowing rules first, and then creating PCIe resource 105 lending rules second, it should be understood that the PCIe rules may be created in either order depending on the implementation. It should also be understood that a particular asset 100 may participate in the PRMS ecosystem 180 as a lender only, as a borrower only, or as both a lender and as a borrower, depending on the preference of the asset 100 owner or organization.

In some embodiments, default sharing rules (both PCIe resource 105 borrowing rules and PCIe resource 105 lending rules) are automatically created for an asset 100 when the asset 100 is registered in the PRMS ecosystem 180 according to the organization ID 255. For example, a given organization may establish default sharing rules 135 that all assets 100 associated with the organization will share GPU resources with each other at all times. When an asset 100 associated with the organization ID is registered in the PRMS ecosystem 180, an appropriate set of sharing rules will be established for the asset 100 to implement this default rule. Accordingly, in some embodiments, default sharing rules may result in a determination of YES at block 315, accompanied with selection of default PCIe resources 105 in block 325 and selection of default time rules in block 330. Alternatively, upon entry of an asset 100 or new PCIe resource 105 into the PRMS ecosystem 180 (blocks 300, 305, 310) the process may skip to block 335 and skip to block 370 to directly enter default PCIe resource 105 hearing rules for the asset 100 in the PCIe resource registration datastore 130.

Figure 4:
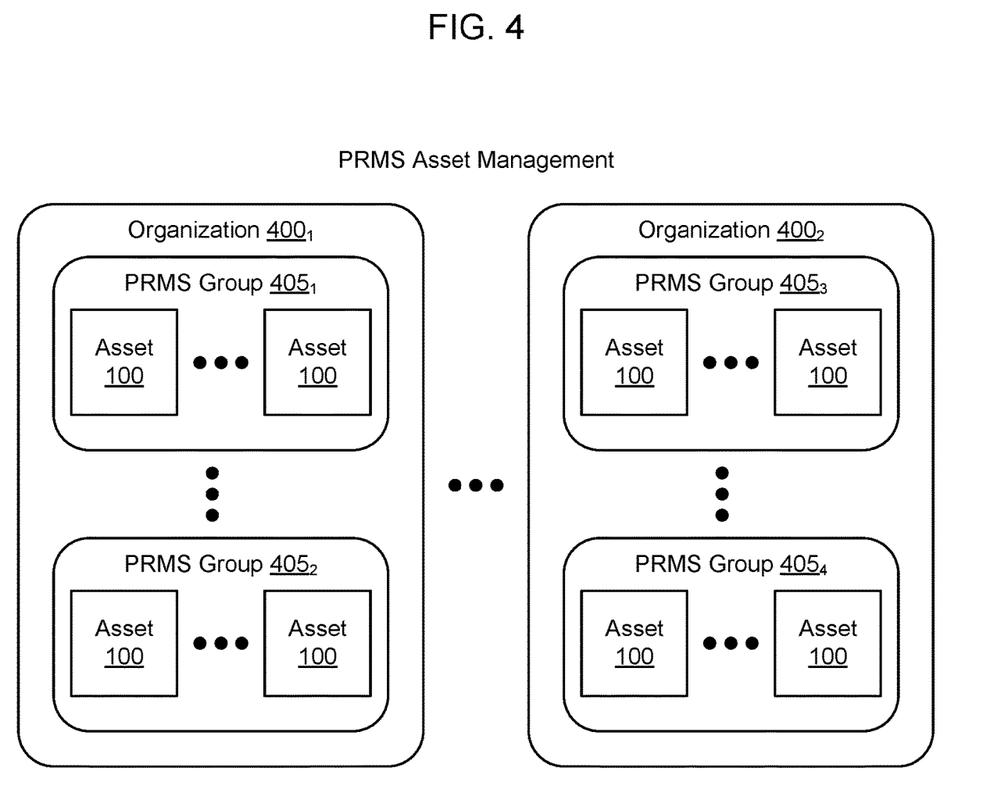
FIG. 4 is a functional block diagram of an example set of logical groups of assets maintained by a PCIe resource registration subsystem, according to some embodiments.

FIG. 4 is a functional block diagram of an example set of logical groups of assets maintained by a PCIe resource registration subsystem, according to some embodiments. As shown in FIG. 4, in some embodiments the PCIe resource registration datastore 130 enables logical associations to be made between assets 100 that are allowed to share PCIe resources 105 within the PRMS ecosystem 180. Example logical associations may be to identify assets 100 as belonging to organizations 400 and preventing assets 100 from sharing PCIe resources 105 outside of the organization 400. Associating an asset 100 with an organization 400 may be based on the organization ID 255 or another value set by the asset 100 during the registration process. Another logical association may be to form PRMS groups 405 within organizations 400, and to prevent assets 100 from sharing PCIe resources 105 outside of the PRMS groups 405. PRMS group association may be based on the PRMS ID 260, the asset 100 PK 250, or another value set by the asset 100 during the registration process. Although FIG. 4 shows two levels of logical associations, other levels of logical associations between assets 100 may be implemented as well.

Further, although FIG. 4 shows separate groups of assets 100 belonging different logical associations, it should be understood that a given asset 100 may belong to multiple logical associations, such that the logical associations are implemented at the PCIe resource 105 level. For example, an asset 100 may have a first PCIe resource 105 that is allowed to be shared with a first logical group of assets 100, and may have a second PCIe resource 105 that is allowed to be shared with a second logical group of assets 100. Likewise, the asset 100 may be long to different logical groups for lending and sharing.

FIG. 5 is a functional block diagram of an example data structure 500 configured to implement a PCIe resource registration datastore 130, according to some embodiments. As shown in FIG. 5, in some embodiments the PCIe resource registration datastore 130 is implemented to include a data structure 500 such as a table, that contains rules specifying which PCIe resources 105 a particular asset 100 is able to borrow within the PRMS ecosystem 180, and which PCIe resources 105 a particular asset 100 is able to lend within the PRMS ecosystem 180. In some embodiments, the rules are specific to the asset 100 and specify the asset 100 according to the asset 100 PK 250, organization ID 255, optionally group ID 505. Although a particular data structure 500 in the form of a table has been shown in FIG. 5, it should be understood that other forms of data structures can be used to implement the datastore 130 depending on the implementation.

Each asset 100 entry in the PCIe resource registration datastore 130 includes a set of borrow rules 510 which specify borrowing parameters associated with each type of PCIe resource 105 that the asset 100 is allowed to borrow. The borrowing parameters are set up during the registration process and include, for example, the type of PCIe resource 105, and the time during which the asset 100 is allowed to borrow that type of PCIe resource 105. For example in FIG. 5, asset 100 1050052 has a first borrow rule associated with PCIe resource 105: CPU, allowing the asset 100 to borrow that type of resource but only between the hours of 12 AM and 5 AM. Asset 100 1050052 also has another borrow rule associated with PCIe resource 105: GPU, allowing the asset 100 to borrow that type of resource from other assets 100 at all times.

Each asset 100 entry in the PCIe resource registration datastore 130 also includes a set of lend rules 515 which specify lending parameters associated with each type of PCIe resource 105 that the asset 100 is allowed to lend to other assets in the logical group of assets associated with the organization ID. The lending parameters are set up during the registration process and include, for example, the type of PCIe resource 105, and the time during which the asset 100 is allowed to lend that type of PCIe resource 105. For example in FIG. 5, asset 100 1050052 has a first lend rule associated with PCIe resource 105: CPU, allowing the asset 100 to lend that type of resource to other assets 100 at all times. Asset 100 1050052 also has another lend rule associated with PCIe resource 105: GPU, allowing the asset 100 to lend that type of resource to other assets 100, but only between the hours of 7 AM and 6 PM.

In some embodiments, the PCIe resource registration datastore 130 may include one or more additional parameters associated with the individual borrowing rules 510, lending rules 515, or associated with the asset 100 itself. Some example other parameters might include credit accretion information associated with lending a PCIe resource 105 or credit depletion associated with borrowing a PCIe resource 105.

In some embodiments, the additional parameters associated with individual PCIe resources 105 might include conditional information associated with whether a particular PCIe resource 105 to be made available to other assets 100, for example based on a usage level of the PCIe resource 105 by the asset 100. As an example, a lending rule may be established for a particular PCIe resource 105 that indicates that the PCIe resource 105 should be always available to be used by other assets 100. However, the additional parameters may dictate that the PCIe resource 105 should not be made available to be used by other assets 100 if the current usage level of the PCIe resource 105 is at or above a threshold percentage usage level.

FIG. 6 is a functional block diagram of an example data structure configured to implement a current PCIe resource utilization datastore 145, according to some embodiments. In some embodiments, the PRMS 170 is configured to monitor operation of assets 100 and automatically obtain required PCIe resources 105 for assets 100 based on SLA information 135, to enable the assets 100 to meet its SLA objectives. To implement this, in some embodiments, the PRMS includes PCIe resource 105 usage monitoring subsystem 140. The PCIe resource 105 usage monitoring subsystem 140 receives PCIe resource 105 usage information from PCIe resource 105 monitoring client 245 of PRMS clients 115 (see FIG. 2) and stores current PCIe resource 105 usage information in current PCIe resource utilization datastore 145.

FIG. 7 is a functional block diagram of an example data structure configured to implement a historic PCIe resource utilization datastore 160, according to some embodiments.

As shown in FIG. 7, in some embodiments, the PRMS 170 maintains a historic PCIe resource utilization datastore 160 containing a data structure with entries based on PCIe resources 105 that have been shared between assets 100 of the PRMS ecosystem 180. A separate data structure may be maintained for each organization or a common data structure may be used to contain entries for multiple organizations. In some embodiments, each entry identifies the borrowing asset 100 PK 700, and the lending asset 100 PK 705. Optionally, the entries may also contain the organization ID and group ID, but these values may be omitted in some embodiments since these values are derivable from other systems of PRMS 170.

The entries of historic PCIe resource utilization datastore 160, in some embodiments, include the PCIe resource 105 type 720 and the duration of the PCIe resource 105 usage. In embodiments where credits are used to facilitate tracking by the PRMS of the relative use of PCIe resources 105 among assets 100, the entries of the historic PCIe resource utilization datastore 160 can include credit accretion information associated with lending a PCIe resource 105 or credit depletion associated with borrowing a PCIe resource 105, for example in a ledger or distributed ledger.

Figure 8:
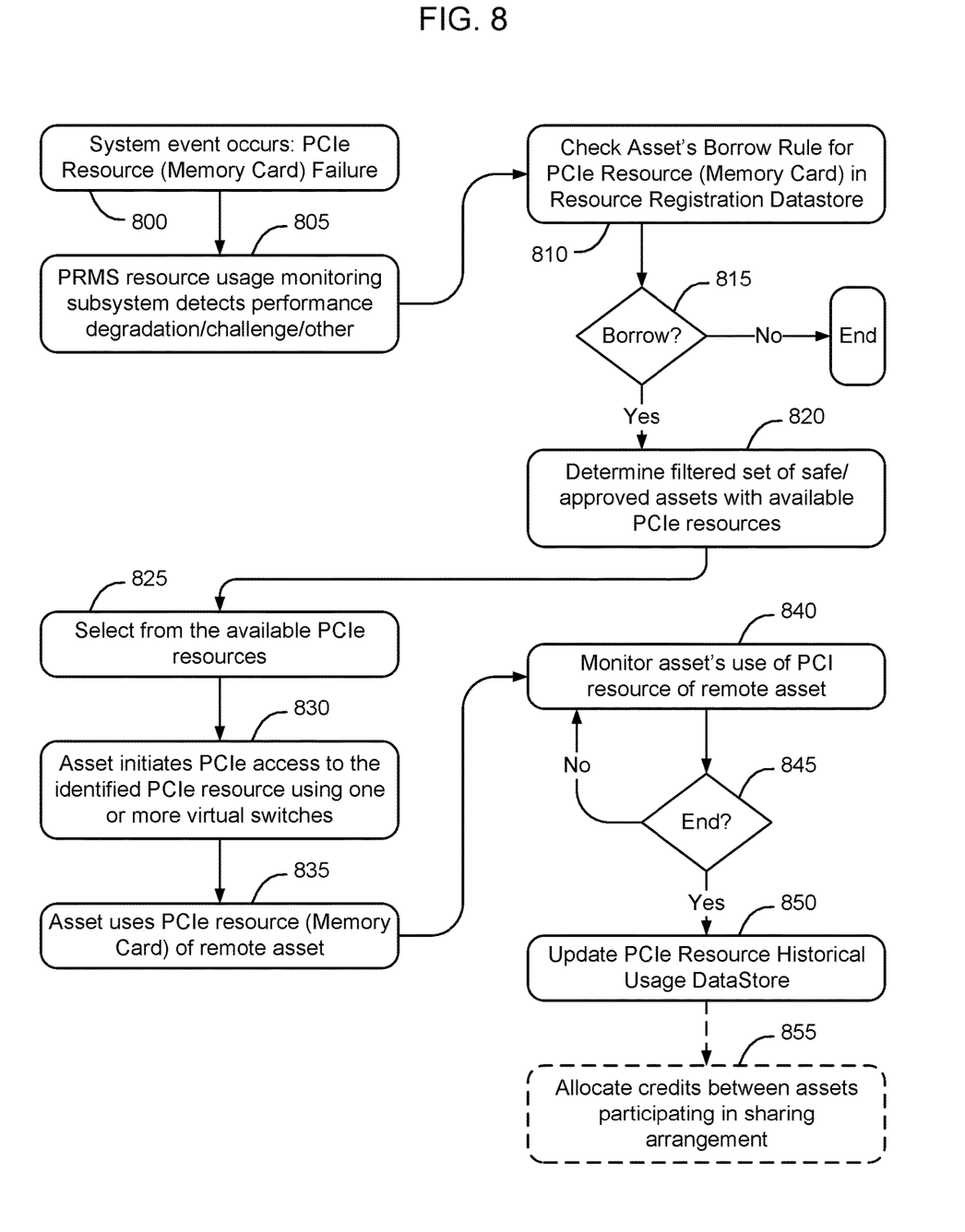
FIG. 8 is a flow chart of an example use case scenario that might be implemented using the PRMS of FIG. 1 to enable one asset to selectively borrow PCIe resources from another of the assets, according to some embodiments.

FIG. 8 is a flow chart of an example use case scenario that might be implemented using the PRMS of FIG. 1 to enable one asset 100 to selectively borrow PCIe resources 105 from another of the assets 100 of the logical association of assets, according to some embodiments.

In some embodiments, the current PCIe resource utilization datastore 145 is used by the PCIe resource 105 usage monitoring subsystem 140 to determine when one or more of the assets 100 requires additional PCIe resources 105. For example, as shown in FIG. 8, in some embodiments the PCIe resource 105 usage monitoring subsystem 140 receives periodic usage updates from PRMS clients 115 to detect system events on assets 100, such as failure of a PCIe resource 105 (block 800). For example, if a memory card on asset 100 fails, PCIe resource 105 usage monitoring subsystem 140 will detect the PCIe resource 105 failure, for example by detecting a performance degradation or other reduction in system performance (block 805). One example performance degradation that may be detected by the PCIe resource 105 usage monitoring subsystem 140 might be a failure of the PCIe resource 105 of the asset 100 to meet stated SLA objectives.

When the PCIe resource 105 usage monitoring subsystem 140 determines that one of the assets 100 requires additional PCIe resources 105, the PCIe resource 105 usage monitoring subsystem 140 notifies the PCIe resource assignment subsystem 150 to assign PCIe resources 105 to the asset 100. The PCIe resource assignment subsystem 150 checks the asset's 100 borrow rule for the particular PCIe resource 105 that is required by the asset 100 (Block 810). For example, if the system event that occurs in block 800 is a failure of a memory card, in block 810 the PCIe resource assignment subsystem 150 checks the borrow rule for the asset 100 to determine if the asset 100 is allowed to borrow use of PCIe resources in the form of a memory card from another asset 100 in the PRMS ecosystem 180, and what times the asset is allowed to borrow this type of PCIe resource 105.

Based on the borrow rule for the asset 100, a determination is made as to whether the asset 100 is allowed to borrow use of the required PCIe asset 100 (block 815). If the asset 100 is not allowed to borrow the required PCIe asset 100 (a determination of NO at block 815), the process ends and the asset 100 is not allowed to borrow the required PCIe asset 100 in the PRMS ecosystem 180. Optionally, a notification may be generated by notification subsystem 120 to indicate that a system issue associated with the asset 100 was detected in block 800, but that the asset 100 was determined to not have permission to remedy the system issue in block 815 because the asset does not have permission to borrow the required PCIe resource 105 through the PRMS ecosystem 180.

If the asset 100 is allowed to borrow the required PCIe asset 100 (a determination of YES at block 815), the PCIe resource assignment subsystem 150 determines a filtered set of safe/approved assets 100 with available PCIe resources 105 of the required type (block 820). In some embodiments, the PCIe resource assignment subsystem 150 determines which assets 100 are included in the same organization or other logical grouping as the asset 100 that requires the PCIe resource 105. In some embodiments, the set of trusted assets 100 in the PRMS ecosystem 180 is specified in the borrow rule for the PCIe resource 105 retrieved from the PCIe resource registration datastore 130.

Once the set of safe/approved assets 100 with available PCIe resources 105 of the required type is determined (block 820), the PCIe resource assignment subsystem 150 selects one of the available PCIe resources 105 (block 825). In some embodiments, the PCIe resource assignment subsystem 150 uses the current PCIe resource utilization datastore 145 to select an asset 100 that is currently not intensively using the required PCIe resource 105. For example, the PCIe resource assignment subsystem 150 may select the asset 100 with the lowest current use of the required PCIe resource 105. Optionally, the PCIe resource assignment subsystem 150 may also determine historic use by the assets 100 of the required PCIe resource 105 from the historic PCIe resource utilization datastore 160, and determine which asset 100 is likely to have continued low usage of the required PCIe resource 105 for the upcoming period of time when the asset 100 is planning to borrow the required PCIe resource 105.

Once an asset 100 with the required PCIe resource 105 has been selected (block 825), the asset 100 requiring the PCIe resource 105 is notified and initiates PCIe access to the identified PCIe resource 105 using one or more of the virtual switches 235 (block 830). Via virtual switch 235, the operating system 230 is able to access the PCIe resource 105 of the remote access and use the required borrowed PCIe resource 105 (block 835).

In some embodiments, the PCIe resource assignment monitoring subsystem 155 monitors use of the borrowed PCIe resource 105 by the borrowing asset 100 (block 840) to detect when use of the borrowed PCIe resource 105 ends (block 845). When the PCIe resource assignment monitoring subsystem 155 determines that the use of the borrowed PCIe resource 105 ends (a determination of YES at block 845), the PCIe resource assignment monitoring subsystem 155 updates the PCIe resource historical PCIe resource utilization datastore 160 (block 850). Optionally, in embodiments where use of borrowed PCIe resource 105 is traced using credits, the PRMS may allocate credits between the assets 100 that participated in the PCIe borrowing arrangement (block 855).

As described in greater detail above, in some embodiments the PRMS ecosystem 180 is configured to intercept the asset buying process. Prior to, or at the point of acquisition of an asset, the asset is added to the PCIe resource registration datastore 130. The asset may inherit existing values (PCIe resource borrowing and lending rules) from their organization, or custom PCIe resource borrowing and lending rules may be established for the asset. In some embodiments, if the organization does not have pre-set PCIe resource borrowing and lending rules that are to be applied to assets participating in the PRMS ecosystem 180, the PRMS client 115 on the asset may prompt an administrator to set up PCIe resource borrowing and lending rules via a user interface, API, or other system setup process.

In connection with setting up the PCIe resource borrowing rules, the user is prompted to identify when the current asset should be allowed to use extra PCIe resources from other assets, and from which logical group of other assets the current asset should be allowed to borrow those PCIe resources. For example, in an enterprise setting, the logical group of other assets might be a set of assets in the organization that are in the same geographic area or in the same business unit. In a commercial setting, the logical association of assets may include security selections, colocation, or other vendor data. Other logical associations may be created depending on the implementation. The PCIe resource borrowing rules are stored in the PCIe resource registration datastore 130.

In connection with setting up the PCIe resource lending rules, the user is prompted to identify when the PCIe resources of the current asset should be allowed to be used by other assets, which PCIe resources are allowed to be used by other assets, and which logical group of other assets should be allowed to use the asset's PCIe resources. The PCIe resource lending rules are stored in the PCIe resource registration datastore 130.

When a new asset is added to the PRMS ecosystem 180, in some embodiments the PCIe resource usage monitoring subsystem 140 determines, from the historic PCIe resource utilization datastore 160, whether the logical group of assets that the current asset has been assigned to has sufficient PCIe resources. This facilitates overprovisioning determinations. If the PCIe resource usage monitoring subsystem 140 determines that the logical group of assets has insufficient PCIe resources of a particular type, based on the historic PCIe resource utilization, the PCIe resource usage monitoring subsystem 140 in some embodiments messages the notification subsystem 120 to generate an alert that PCIe resources of the particular type should be added to the assets of the logical asset group.

Example Use Case #1

During registration, an asset 100 establishes a borrowing rule that allows the asset 100 to borrow memory card resources from any other asset 100 in a logical group of assets. A system event occurs, in which a memory card on the asset experiences failure. The PCIe resource usage monitoring subsystem 140 detects a system performance degradation on the asset and notifies the PCIe resource assignment subsystem 150 that the asset requires additional PCIe resources in the form of additional memory card resources.

The PCIe resource assignment subsystem 150 checks the asset's PCIe resource (memory card) borrowing rule in the PCIe resource registration datastore 130 and determines that the asset is allowed to borrow PCIe (memory card) resources from other assets in the logical group. The PCIe resource assignment subsystem 150 identifies a filtered set of safe/approved resources of assets in the logical group, and checks the current PCIe resource utilization datastore 145 to determine which asset has available PCIe (memory card) resources. The PCIe resource assignment subsystem 150 selects one of the assets that has available PCIe (memory card) resources and notifies the asset to use the PCIe (memory card) resources of the selected other asset in the logical group of assets. The virtual switch 235 in the asset's operating system 230 accesses the PCIe (memory card)

resources on the selected other asset to make those PCIe resources available to the asset 100. In this manner, PCIe (memory card) resources are able to be made available in the event of failure.

Example Use Case #2

A company is leasing a number of assets from an equipment manufacturer, and knows that the assets will not be used during the night-time. The company would like to enable those assets to be used by other companies, for example in connection with obtaining a reduction in the amount of money the company needs to pay to lease the assets. When adding the assets to the PRMS ecosystem 180, the company specifies that the PCIe resources of the assets are available to be used by other companies between the hours of 8 PM and 6 AM, which allows the equipment manufacturer to lease the assets to other companies during those hours.

A doctor in a hospital needs to use, on a regular basis, a powerful laptop during the night shift to review and diagnose MRI images. The doctor subscribes to the PRMS ecosystem 180 and creates a borrowing rule that enables the doctor's asset to borrow PCIe resources (CPU processing power) for several hours to supplement the PCIe resources of the doctor's asset.

At the designated time, the PCIe resource assignment subsystem 150 identifies a filtered set of safe/approved resources of assets in the logical group of assets that were identified to be used by the doctor, and checks the current PCIe resource utilization datastore 145 to determine which assets have available PCIe (CPU) resources. The PCIe resource assignment subsystem 150 selects one of the assets that has available PCIe (CPU) resources and notifies the doctor's asset to use the PCIe (CPU) resources of the selected other asset in the logical group of assets. The virtual switch 235 in the doctor's asset's operating system 230 accesses the PCIe (CPU) resources on the selected other asset to make those PCIe resources available to the doctor's asset 100. In this manner, PCIe (CPU) resources are able to be made available in the event of failure.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of establishing trusted PCIe resource sharing, comprising:
   registering an asset with a PCIe resource management system, the asset including a set of PCIe resources, a virtual switch implemented in an operating system of the asset to provide access to the set of PCIe resources and to enable the asset to access PCIe resources of other assets;
   establishing PCIe resource sharing rules for the asset in the PCIe resource management system, the PCIe resource sharing rules specifying a logical group of other assets that can use the set of PCIe resources of the asset, the logical group of other assets being a subset of all assets registered with the PCIe resource management system;
   assigning PCIe resources to the asset from the logical group of other assets based on the PCIe resource sharing rules; and
   enabling use of the asset's PCIe resources by assets of the logical group of other assets based on the PCIe resource sharing rules;
   wherein the PCIe resource sharing rules include separate PCIe resource borrowing rules and PCIe resource lending rules; and
   wherein the PCIe resource borrowing rules specify what type of PCIe resources the asset can borrow from other assets in the logical group of assets, what times the PCIe resources can be borrowed, and the logical group of other assets from which the asset is allowed to borrow the PCIe resources.

2. The method of claim 1, wherein the PCIe resource borrowing rules comprise a set of PCIe resource borrowing rules, each PCIe resource borrowing rule specifying a particular type of PCIe resource, when the asset can borrow the PCIe resource, and the logical group of other assets from which the asset is allowed to borrow the PCIe resource.

3. The method of claim 1, wherein the separate PCIe resource borrowing rules and PCIe resource lending rules are default PCIe resource sharing rules that apply to all assets of the logical group of other assets.

4. The method of claim 1, further comprising monitoring PCIe resource usage by the asset, and wherein the step of assigning PCIe resources to the asset from the logical group of other assets occurs in response to detecting that the asset requires additional PCIe resources.

5. A method of establishing trusted PCIe resource sharing, comprising:
   registering an asset with a PCIe resource management system, the asset including a set of PCIe resources, a virtual switch implemented in an operating system of the asset to provide access to the set of PCIe resources and to enable the asset to access PCIe resources of other assets;

establishing PCIe resource sharing rules for the asset in the PCIe resource management system, the PCIe resource sharing rules specifying a logical group of other assets that can use the set of PCIe resources of the asset, the logical group of other assets being a subset of all assets asserts registered with the PCIe resource management system;

assigning PCIe resources to the asset from the logical group of other assets based on the PCIe resource sharing rules; and enabling use of the asset's PCIe resources by assets of the logical group of other assets based on the PCIe resource sharing rules;

wherein the PCIe resource sharing rules include separate PCIe resource borrowing rules and PCIe resource lending rules; and wherein the PCIe resource lending rules specify what type of PCIe resources can be lent, what times the PCIe resources can be lent, and the logical group of other assets that the asset will allow to access its PCIe resources.

6. The method of claim 5, wherein the PCIe resource lending rules comprise a set of PCIe resource lending rules, each PCIe resource lending rule specifying a particular type of PCIe resource, when the asset will lend the PCIe resource to other assets of the logical group of assets, and the logical group of other assets that the asset will allow to access its PCIe resources.

7. The method of claim 5, wherein the separate PCIe resource borrowing rules and PCIe resource lending rules are default PCIe resource sharing rules that apply to all assets of the logical group of other assets.

8. The method of claim 5, further comprising monitoring PCIe resource usage by the asset, and wherein the step of assigning PCIe resources to the asset from the logical group of other assets occurs in response to detecting that the asset requires additional PCIe resources.

9. A PCIe resource management system, comprising:

a PCIe resource registration subsystem configured to register assets with a PCIe resource management system, each asset including a set of PCIe resources, a virtual switch implemented in an operating system of the asset to provide access to the set of PCIe resources and to enable the asset to access PCIe resources of other assets;

wherein registering assets with the PCIe resource management system includes establishing PCIe resource sharing rules for the assets in the PCIe resource management system, the PCIe resource sharing rules specifying, for each asset, a logical group of other assets that can use the set of PCIe resources of the asset, the logical group of other assets being a subset of all assets registered with the PCIe resource management system;

the resource management system further comprising a PCIe resource assignment subsystem configured to assign PCIe resources to assets from the logical group of other assets based on the PCIe resource sharing rules, and enable use of the asset's PCIe resources by assets of the logical group of other assets based on the PCIe resource sharing rules;

wherein the PCIe resource sharing rules include separate PCIe resource borrowing rules and PCIe resource lending rules; and wherein the PCIe resource borrowing rules specify what type of PCIe resources the asset can borrow from other assets in the logical group of assets, what times the PCIe resources can be borrowed, and the logical group of other assets from which the asset is allowed to borrow the PCIe resources.

10. The PCIe resource management system of claim 9, further comprising a PCIe resource registration datastore containing a data structure having entries containing the PCIe resource sharing rules.

11. The PCIe resource management system of claim 9, further comprising a PCIe resource usage monitoring system configured to monitor current PCIe usage by the assets.

12. The PCIe resource management system of claim 11, further comprising a PCIe resource assignment subsystem configured to use the PCIe resource sharing rules to select PCIe resources to be assigned to a particular asset from other assets in the logical group of other assets associated with the particular asset.

13. The PCIe resource management system of claim 9, wherein the PCIe resource borrowing rules comprise a set of PCIe resource borrowing rules, each PCIe resource borrowing rule specifying a particular type of PCIe resource, when the asset can borrow the PCIe resource, and the logical group of other assets from which the asset is allowed to borrow the PCIe resource.

14. The PCIe resource management system of claim 9, wherein the PCIe resource lending rules specify what type of PCIe resources can be lent, what times the PCIe resources can be lent, and the logical group of other assets that the asset will allow to access its PCIe resources.

15. The PCIe resource management system of claim 14, wherein the PCIe resource lending rules comprise a set of PCIe resource lending rules, each PCIe resource lending rule specifying a particular type of PCIe resource, when the asset will lend the PCIe resource to other assets of the logical group of assets, and the logical group of other assets that the asset will allow to access its PCIe resources.

16. The PCIe resource management system of claim 9, wherein the separate PCIe resource borrowing rules and PCIe resource lending rules are default PCIe resource sharing rules that apply to all assets of the logical group of other assets.

17. The PCIe resource management system of claim 9, further comprising a PCIe resource usage monitoring system configured to monitor PCIe resource usage by the asset, and wherein assigning PCIe resources to the asset from the logical group of other assets based occurs in response to detecting that the asset requires additional PCIe resources.

* * * * *